(12) United States Patent
Kouvo et al.

(10) Patent No.: US 8,714,286 B2
(45) Date of Patent: May 6, 2014

(54) MINING VEHICLE AND METHOD FOR ITS ENERGY SUPPLY

(75) Inventors: Mikko Kouvo, Tampere (FI); Jukka Osara, Tampere (FI); Juha Piipponen, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 71 days.

(21) Appl. No.: 13/519,426

(22) PCT Filed: Dec. 27, 2010

(86) PCT No.: PCT/FI2010/051087
§ 371 (c)(1),
(2), (4) Date: Sep. 6, 2012

(87) PCT Pub. No.: WO2011/080392
PCT Pub. Date: Jul. 7, 2011

(65) Prior Publication Data
US 2013/0206490 A1   Aug. 15, 2013

(30) Foreign Application Priority Data

Dec. 28, 2009  (FI) .................................. 20096403
May 25, 2010  (FI) .................................. 20105580

(51) Int. Cl.
*B60L 9/16*  (2006.01)

(52) U.S. Cl.
USPC ................ 180/2.1; 180/65.1; 903/907; 191/4

(58) Field of Classification Search
USPC ............. 180/2.1, 65.1, 65.21, 65.8; 903/902, 903/903, 907; 307/9.1, 10.1; 191/3, 4, 12 R
See application file for complete search history.

(56) References Cited

U.S. PATENT DOCUMENTS

| | | | |
|---|---|---|---|
| 5,293,947 A | | 3/1994 | Stratton |
| 5,582,262 A | * | 12/1996 | Wust .............................. 180/2.1 |
| 5,698,905 A | * | 12/1997 | Ruthlein et al. ................ 290/32 |
| 5,705,859 A | | 1/1998 | Karg et al. |
| 5,990,652 A | | 11/1999 | Meisner |
| 7,053,568 B2 | | 5/2006 | Rudinec |

(Continued)

FOREIGN PATENT DOCUMENTS

| | | |
|---|---|---|
| CA | 2 783 724 | 7/2011 |
| CN | 2496170 Y | 6/2002 |

(Continued)

OTHER PUBLICATIONS

Office Action (with English translation) for Japanese Patent Application No. 2012-546476, dated Aug. 27, 2013.

(Continued)

*Primary Examiner* — John Walters
(74) *Attorney, Agent, or Firm* — Morgan, Lewis & Bockius LLP

(57) ABSTRACT

The invention relates to a mining vehicle and method for its energy supply. The mining vehicle has a rectifier, DC intermediate circuit, and inverter, through which an alternating current motor is supplied. At least one auxiliary energy source is connected to the DC intermediate circuit. A DC/DC converter is connected between the DC intermediate circuit and the auxiliary energy source for adapting the voltage level of the auxiliary energy source and for connecting the auxiliary energy source to supply energy to the DC intermediate circuit.

11 Claims, 1 Drawing Sheet

(56) References Cited

U.S. PATENT DOCUMENTS

| | | | |
|---|---|---|---|
| 8,550,007 B2 * | 10/2013 | Mazumdar et al. | 104/289 |
| 2001/0017239 A1 | 8/2001 | Tajima et al. | |
| 2002/0053490 A1 | 5/2002 | Banno et al. | |
| 2004/0245952 A1 | 12/2004 | Yamada et al. | |
| 2009/0267412 A1 | 10/2009 | Kitanaka | |
| 2012/0298004 A1 | 11/2012 | Osara et al. | |

FOREIGN PATENT DOCUMENTS

| | | |
|---|---|---|
| EP | 0 703 182 A2 | 3/1996 |
| EP | 2 051 358 A1 | 4/2009 |
| FI | 112008 B | 10/2003 |
| JP | 6-510418 | 11/1994 |
| JP | 8-508391 | 9/1996 |
| JP | 2000-328900 | 11/2000 |
| JP | 2008-190212 | 8/2008 |
| JP | 2009-248707 | 10/2009 |
| RU | 2 100 221 C1 | 12/1997 |
| WO | WO2008/129128 | 10/2008 |

OTHER PUBLICATIONS

Office Action for Canadian Patent Application No. 2,784,670; dated Sep. 20, 2013.

English translation of Office Action for Russian Patent Application No. 2012132441/11(051360) dated Oct. 15, 2013.

Office Action for Finnish Application No. 20096403, dated Oct. 26, 2010.

Office Action for Finnish Application No. 20105580, dated Nov. 4, 2010.

\* cited by examiner

US 8,714,286 B2

MINING VEHICLE AND METHOD FOR ITS ENERGY SUPPLY

BACKGROUND OF THE INVENTION

The invention relates to a mining vehicle with a carriage, drive equipment for moving the carriage, at least one mining work device which is one of the following: a rock drilling machine, bolting machine, shotcreting device, scaling device, injection device, blasthole charger, measuring device; alternating current electric motor, connection for supplying it from the electrical network of the mine, DC intermediate circuit to which electricity is supplied from the electrical network of the mine with a rectifier, inverter for supplying the electric energy of the DC intermediate circuit to the alternating current electric motor, and an auxiliary energy source connected to the DC intermediate circuit.

The invention further relates to a method for the energy supply of a mining vehicle with a carriage, drive equipment for moving the carriage, at least one mining work device which is one of the following: a rock drilling machine, bolting machine, shotcreting device, scaling device, injection device, blasthole charger, measuring device; and at least one alternating current electric motor that is supplied from the electrical network of the mine through a rectifier, DC intermediate circuit, and inverter.

In mines, rock drilling rigs and other mining vehicles are used to perform operations according to the work cycles of the mining work devices at pre-planned work sites. After the necessary tasks, such as borehole drilling, according to the work cycle are performed, the mining vehicle is moved to the next work site and a new work cycle is started. In underground mines, in particular, mining vehicles are generally used, in which the driving energy for the operations according to the work cycles is electricity from an electrical network of the mine. By contrast, transfer drives between work sites are performed by means of driving energy obtained using a combustion engine, typically diesel engine, whereby electric cables or the like do not restrict the transfer drives. However, exhaust gases and noise from a combustion engine cause problems in mines. In addition, a combustion engine requires a lot of space on the carriage of the vehicle, and necessitates regular maintenance. A combustion engine also has adverse effects on the fire safety of the mine, since it has hot surfaces and it also is necessary to store and handle flammable fuel in the vehicle and mine.

Mining vehicles that are continuously connected to the electrical network of the mine are also used in mines. The mining vehicles then have an electric motor, and typically an electric motor with a constant rotation rate is used. The power required by the work phase may then be adjusted with hydraulic components, and the electric motor obtains the electric current and load power defined by the energy consumption of the work phase from the electrical network of the mine. Further, the movement of the mining vehicle is then typically bound to the electrical network or at least to a cable connected thereto and coiled in the mining vehicle or at the fixed electrical network.

Publication U.S. Pat. No. 7,053,568, for example, presents a battery-driven mining vehicle. The publication describes in particular the use and positioning of a battery and alternating current motors as components of drive transmission. A problem with such a mining vehicle that is fully dependent on batteries is the additional weight caused by the transported batteries. In addition, the capacity of the batteries is quite limited, and the batteries of the mining vehicle need to be charged relatively often.

Publication U.S. Pat. No. 5,293,947 presents a mining vehicle that receives its electric supply from an overhead busbar system. The mining vehicle also has a switch for selecting whether the energy used by the mining vehicle is taken from the electrical network or from an auxiliary energy source, such as battery or diesel motor, in the mining vehicle. When the energy is taken from the auxiliary energy source, the mining vehicle can be moved short distances without connecting the mining vehicle to the overhead electrical network.

BRIEF DESCRIPTION OF THE INVENTION

It is an object of the present invention to provide a new type of mining vehicle and a method for its energy supply.

The mining vehicle of the invention is characterised in that the mining vehicle has a DC/DC converter between an auxiliary energy source and DC intermediate circuit for adapting the voltage level of the auxiliary energy source and for connecting the auxiliary energy source to supply energy to the DC intermediate circuit, whereby auxiliary energy sources of different properties may be connected to the mining vehicle.

Further, the method of the invention is characterised in that with the DC/DC converter, the voltage level of the auxiliary energy source is adapted to the DC intermediate circuit and the auxiliary energy source is adapted to supply energy to the DC intermediate circuit, whereby auxiliary energy sources of different properties may be connected to the mining vehicle.

The mining vehicle obtains its energy supply mainly from the electrical network of the mine. The mining vehicle further has a rectifier, DC intermediate circuit, and inverter, which means that the mining vehicle has an alternating current electric motor. Further, at least one auxiliary energy source is connected to the DC intermediate circuit. A DC/DC converter is connected between the DC intermediate circuit and auxiliary energy source to adapt the voltage levels and charging/discharging current of the DC intermediate circuit and auxiliary energy source. This means that disparate auxiliary energy sources may be arranged to the DC intermediate circuit of the device. The power or charging capacity of the auxiliary energy sources may vary or they may be chemically different or their charging voltages may differ from each other, or new and old auxiliary energy sources maybe be used. In spite of the differences in the auxiliary energy sources, arranging them to the DC intermediate circuit is thus easy and simple thanks to the DC/DC converter. Further, thanks to the DC/DC converter it is possible to use several auxiliary energy sources in parallel, if required.

The mining vehicle comprises one or more of the following mining work devices: a rock drilling machine, bolting machine, shotcreting device, scaling device, injection device, blasthole charger, measuring device, or drilling, sealing and propellant feeding equipment used in small-charge excavation. The rock drilling machine may be a face drilling device, or a device used in production hole drilling, that is, a long-hole drilling device that drills boreholes in fan-shape. The mining work device is an actuator used in handling undetached rock and performs several consecutive operations according to a given work cycle. Typically, several similar operations are done with the mining work device at one work site. These operations may be defined in an excavation plan, such as a drilling plan, charging plan, or corresponding mining plan. The mining work device is normally arranged to a boom with which the device is moved during the work cycle. On the other hand, the mining work device may be arranged to a corresponding support or support structure in a mining vehicle, which supports the device during its work cycle.

The idea of an embodiment is that the auxiliary energy source is connected to supply energy through the DC intermediate circuit to the electric motor of the mining vehicle when the energy requirement of the mining vehicle exceeds a certain limit. At the same time, energy is also supplied to the mining vehicle from the electrical network of the mine, which means that the auxiliary energy source acts as a supplier of additional energy. The electrical network of the mine is the primary energy source of the mining vehicle through the direct current circuit, that is, the DC intermediate circuit. Alternating current electric motors are energy efficient and their adjustability is good. Further, thanks to the rectifier, DC intermediate circuit and inverter, the system loads the electrical network almost solely with effective output, which reduces the load of the supply network in comparison with a situation where this arrangement does not exist. A three-phase motor connected to the DC intermediate circuit through the inverter is insensitive to the phase sequence of the supply network, whereby separate phase sequence control or change thereof is not needed. Further, the effect of the frequency of the supply network or the variation thereof on the electric motor of the mining vehicle can be eliminated. Problems caused to the electric system of the mining vehicle by over- or undervoltages of the electrical network of the mine can also be reduced when using the present solution. The power from the motor of the mining vehicle can be evened out by an auxiliary energy source connected to the intermediate circuit. Thus, in the presented solution, the auxiliary energy source evens out the load variations caused by the mining vehicle to the electrical network. This way, in a peak load situation, the current taken from the network can be kept lower than before, whereby the effective load of the mining vehicle decreases. The supply cable of the mining vehicle then need not be dimensioned for the peak power of the mining vehicle. All in all, the peak power and the size of idle power of the electrical network of the mine can thus be reduced.

The idea of an embodiment is that the controllable rectifier is adapted to convert the voltage levels of at least two different electrical networks to be the same in the DC intermediate circuit. It is then possible to use in the mining vehicle similar alternating current electric motors in at least two different-voltage electrical networks without needing a separate electromechanical converter in the mining vehicle to convert the voltage of the electrical network to suit the mining vehicle.

BRIEF DESCRIPTION OF THE FIGURES

Some embodiments of the invention will be described in more detail in the attached drawings, in which.

In the figures, some embodiments of the invention are shown simplified for the sake of clarity. Similar parts are marked with the same reference numbers in the figures.

DETAILED DESCRIPTION OF THE INVENTION

Figure 1:
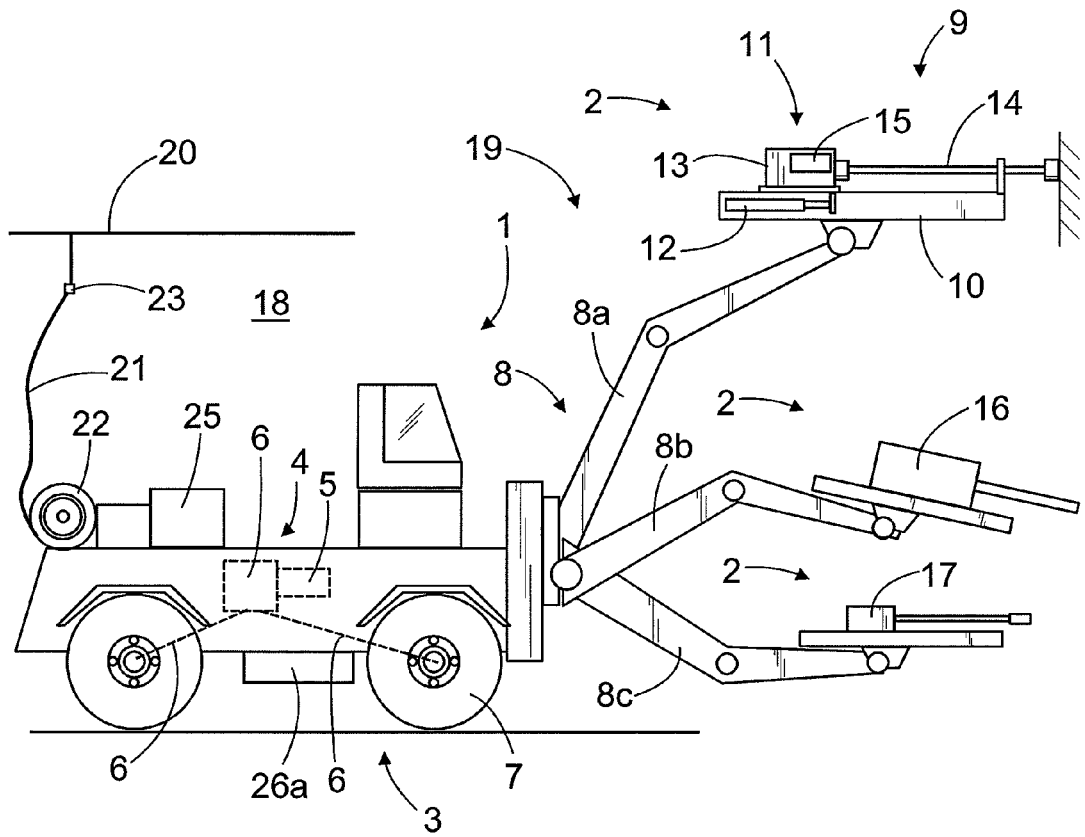
FIG. 1 is a schematic side representation of a mining vehicle, in this case a rock drilling rig.

FIG. 1 shows a rock drilling rig that is one example of a mining vehicle 1 equipped with one or more mining work devices 2. The rock drilling rig comprises a carriage 3 that may be moved by means of drive equipment 4. The drive equipment 4 comprises one or more drive motors 5 and one or more power transmission means 6 for transmitting drive power to one or more wheels 7. The drive power transmission may comprise a mechanical gear system and mechanical power transmission members or, alternatively, the drive power transmission may be hydraulic or electric. There may be one or more booms 8 arranged on the carriage 3, and the boom may be equipped with a mining work device 2. In the embodiment shown in FIG. 1, the first boom 8a is a drilling boom, at the outermost end of which there is a rock drilling unit 9 comprising a feed beam 10, along which a rock drilling machine 11 may be moved by means of a feed device 12. The rock drilling machine 11 may comprise a percussion device 13 for generating impact pulses on a tool and a rotating device 15 for rotating the tool 14 around its longitudinal axis. There may be several of these drilling booms 8a in the rock drilling rigs. By way of example, a second boom 8b is shown to comprise a bolting device 16, with which rock bolts may be arranged in pre-drilled boreholes to support the excavated rock cavern. In the embodiment of FIG. 1, a third boom 8c is equipped with a measuring device 17 for measuring drilled boreholes. Other alternative mining work devices 2 include injection devices used in feeding sealing material into rock, shotcrete processing device, scaling equipment, devices used in small-charge excavation, and devices for feeding explosives.

The mining vehicle 1 is run in accordance with the excavation plan of the mine 18, or a corresponding plan drafted in advance, to a work site 19 where the mining work device 2 performs operations according to the work cycle, the performance of which takes a relatively long time. For instance, the work cycle of a rock drilling machine may include the drilling of several boreholes defined in the drilling plan at the work site 19. Further, the drilling of each borehole typically consists of several work phases, such as collaring, actual drilling, changing extension rods and drill bits, and the dismantling of extension rod equipment after drilling. Performing a drilling work cycle at a work site 19 may take several hours, sometimes even an entire work shift. Correspondingly, charging, bolting, measuring, and injecting are often quite time-consuming operations. Generally, the use of a mining work device 2 has to do with drilling a borehole or further processing a finished hole. This then means handling undetached rock.

FIG. 1 further shows that the mine 18 has an electrical network 20 that may be fixedly constructed, or it may consist of a modifiable network. The electrical network 20 is typically a three-phase alternating current network. When the mining vehicle 1 is at the work site 19, its mining work device 2, hydraulic system and any necessary auxiliary systems are driven mainly by electrical energy obtained from an external electrical network. The mining vehicle 1 may be connected to the electrical network 20 with one or more connection cables 21. The connection cable 21 may be arranged on a reel 22 and it may be equipped with a suitable connector 23 that may be connected to the supply terminal of the electrical network 20. Alternatively, the reel 22 and cable 21 may be arranged in the mine 18, and the connection cable 21 is connected to the mining vehicle 1. The mining vehicle 1 is equipped with a connecting device 25, through which the electricity supplied from the electrical network 20 is connected to different devices of the mining vehicle 1. The structure and operation of the connecting device 25 is described in more detail in connection with FIG. 2.

The mining vehicle 1 is also equipped with at least one auxiliary energy source 26a, 26b. The auxiliary energy source 26a, 26b may be a battery, super capacitor, fuel cell, or diesel motor, or some other corresponding auxiliary energy source.

The connecting device 25 has a rectifier 27, to which electric supply from the electrical network 20 is connected. The rectifier 27 may be fixed or pulse ratio-controlled. The direct current partition of the rectifier 27 is connected to the DC intermediate circuit 28, that is, direct voltage intermediate circuit. A first inverter 29*a* is connected to the DC intermediate circuit 28 to convert direct current to alternating current and to supply alternating current electricity to a first alternating current electric motor 30*a*. The alternating current electric motor 30*a* is preferably a three-phase electric motor. The connecting device 25 may also have a second inverter 29*b* that supplies a second alternating current electric motor 30*b*. The alternating current electric motor 30*a* may drive the mining work device 2, for instance, and the alternating current electric motor 30*b* may drive the drive equipment 4, for example.

The connecting device 25 may also have a third inverter 29*c* or more of them to supply at least one alternating current motor 30*c* of auxiliary drives. A water pump system, air pressure compressor system, auxiliary hydraulics system, or a cooling system 31 of a system in the device may be connected to the electric motor 30*c*.

When using several inverters connected to the same DC intermediate circuit, the supply voltage of the electric motors connected to the inverters may be changed arbitrarily. It is then also possible to adjust arbitrarily the rotation rate of each electric motor connected to the inverter. Thus, there may be more than two inverters, which means that there may also be more than two electric motors. The arrangement also has a control unit 32 that may be arranged in the connecting device 25 or outside it, as required. The control unit 32 is used to control the operation of the various units of the connecting device 25, such as the rectifier 27, inverter 29*a*, 29*b*, and auxiliary energy source 26*a*, 26*b*.

The auxiliary energy source 26*a*, 26*b* is also connected to the DC intermediate circuit 28. The auxiliary energy source 26*a*, 26*b* may be a battery, super capacitor, fuel cell, diesel motor, flywheel, or some other corresponding auxiliary energy source. For instance, a diesel motor may drive the alternating current generator that generates electrical current. If the auxiliary energy source 26*a*, 26*b* generates alternating current electricity, it is connected to the DC intermediate circuit 28 through a rectifier.

Figure 2:
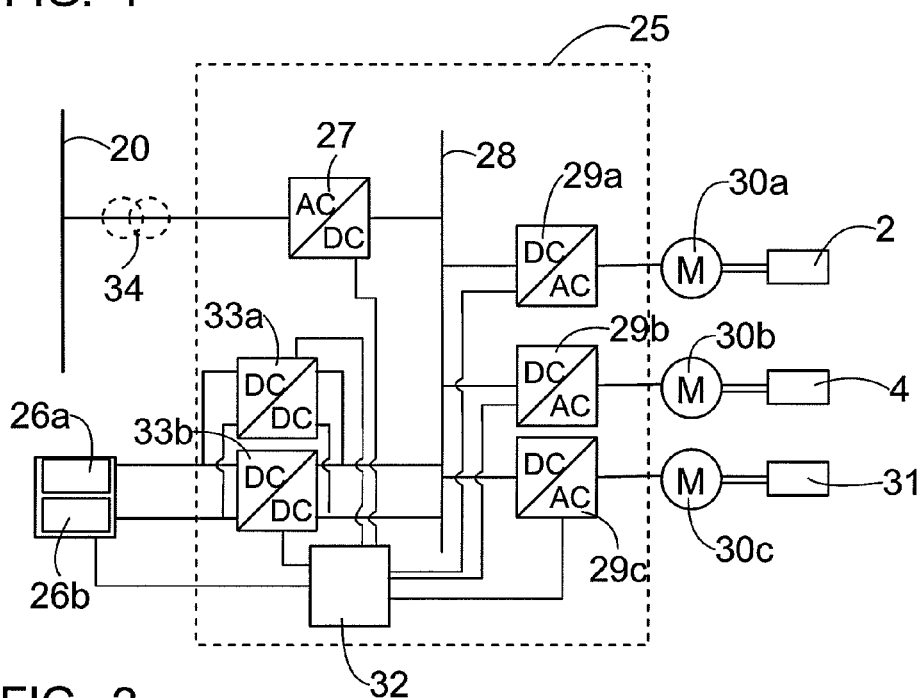
FIG. 2 is a diagram of an energy supply arrangement of a mining vehicle.

The auxiliary energy source 26*a*, 26*b* can also be connected directly to the DC intermediate circuit 28, but preferably the auxiliary energy source 26*a*, 26*b* is connected to the DC intermediate circuit 28 with at least one DC/DC converter 33*a*, 33*b*. The DC/DC converter adapts the voltage level of the auxiliary energy source 26*a*, 26*b* to suit the DC intermediate circuit 28. Further, the DC/DC converter 33*a*, 33*b* manages the energy discharging of the auxiliary energy source and the charging of the auxiliary energy source 26. Disparate auxiliary energy sources 26 may be adapted to the intermediate circuit 28 of the device by the DC/DC converter 33*a*, 33*b*. The auxiliary energy source 26*a*, 26*b* is thus easy to change, or there may be several auxiliary energy sources in parallel, and the DC/DC converter 33*a*, 33*b* ensures their adaptation to the DC intermediate circuit 28. There may also be several DC/DC converters 33*a*, 33*b*, and when one DC/DC converter 33*a*, 33*b* fails, the device may be driven utilizing another DC/DC converter. The embodiment of FIG. 2 shows two DC/DC converters 33*a*, 33*b* in parallel and two auxiliary energy sources 26*a* and 26*b* in parallel. If one of the auxiliary energy sources 26*a*, 26*b* fails, it can be left out of running and the operation can be continued utilizing one auxiliary energy source at a lower power level. This increases the reliability of the mining vehicle and, during malfunctions, the mining vehicle can be moved out of the way without causing any risks to other mining traffic. After this, maintenance can be performed in a safer place. It is naturally possible to connect more than two DC/DC converters and/or auxiliary energy sources in parallel.

The electrical network 20 of the mine is the primary energy source of the mining vehicle. When the mining vehicle 1 needs high power, additional energy is supplied to the mining vehicle from the auxiliary energy source 26*a*, 26*b* to supplement the electrical network 20 of the mine. For instance, during full-power drilling, additional energy may be obtained from the auxiliary energy source 26*a*, 26*b*. It is possible to define in the control unit 32 a certain limit value, after which the auxiliary energy source is taken into use. By means of the auxiliary energy source 26*a*, 26*b*, the electric power taken from the network 20 can be limited to a certain level. Further, the auxiliary energy source can be taken into use to even out peaks in loading or transport vehicles at their maximum energy consumption level, that is, when they move uphill heavily loaded, for example.

The system measures the current used in electric motors and adjusts thereby the supply of the electric power generated by the auxiliary energy source 26*a*, 26*b* to the DC intermediate circuit 28. One idea of the joint use of the auxiliary energy source 26*a*, 26*b* and electrical network 20 is to ensure that the voltage of the electrical network 20 does not, due to overload, decrease below a limit set for the voltage of the electrical network, such as 5% below the nominal voltage. This way, it is possible to avoid voltage variations in the electrical network 20.

FIG. 2 also shows a transformer 34 with a dashed line. The transformer 34 can be used to transform the voltage level of the electrical network 20 to suit the electrical system of the mining vehicle. However, the transformer 34 is not necessarily needed, if the rectifier 27 is adapted to transform the voltage levels of at least two different electrical networks to be the same in the DC intermediate circuit 28. An electrical transformer producing two voltage levels may be implemented by means of gate turn-on thyristors, for example. The direct voltage produced by this type of rectifier can be altered by altering the turn-on angle of the thyristors.

The present equipment can also be used in such a manner that drilling or other work can be done for a short time by using the energy obtainable from the auxiliary energy source 26, even if the electrical network 20 was not available. Further, the electrical network 20 can be used to run the mining vehicle, when the network cable is connected and, when the network is not in use, the auxiliary energy source 26 can be used for running the vehicle. Instead of the connection cable 21 and reel 22, the mining vehicle 1 can be connected to the electrical network 20 in such a manner, for example, that the electrical network is a busbar system to which the mining vehicle 1 is connected through current collectors.

The system can be controlled in such a manner, for example, that at most a certain defined maximum power is taken from the electrical network 20, and when this limit value is exceeded, the rest of the required power is taken from the auxiliary energy source 26. In this case, the power taken from the auxiliary energy source is typically adjusted. Further, when necessary, it is thus possible to take all the power available from the auxiliary energy source and to adjust instead the power taken from the electrical network 20, or take all the required power from the auxiliary energy source, if the electrical network is not available for some reason.

The power taken by the mining vehicle 1 can be determined by measuring the power consumption of the inverters 29*a* to 29*c*. It is then possible to perform a restriction-of-output function, in which the power taken by one or more mining work devices 2 is limited, when the combined power of the inverters 29a to 29c exceeds a certain limit value.

The control unit may comprise a software product, the execution of which in the control unit 32 is arranged to provide at least some of the actions presented in this specification. The software product may be loaded into the control unit from a storage or memory medium, such a memory stick, memory disc, hard disc, information network server or the like, and the execution of the software product in the processor of the control unit computer or the like produces the actions described in this specification in the energy supply of the mining vehicle.

The solutions described in this specification may also be used when excavating tunnels. Tunnels are excavated in rounds. The work site is the face of the tunnel where boreholes are drilled and charged. Before the round is exploded, the rock drilling rig is moved away from the face to a safe point. After the explosion and after the exploded rock is removed, the rock drilling rig is driven from the safe point back to the face of the tunnel to drill another round. Tunnels are excavated in rounds, which means that a new drilling site, that is, new work site, is at a distance corresponding to the length of the round from the previous drilling site, that is, previous work site. The transfer drive is then from the previous work site via the safe point to the next work site.

It should be mentioned that in this specification, a mine refers to underground mines and opencast mines. Further, the method and mining vehicle may be used at contract work sites, such as when excavating different rock facilities. Therefore, a contract work site may also be considered a type of mine. At contract work sites an external electrical network may be modifiable, such as an aggregate on a movable carriage.

In some cases, the features described in this specification may be used as such, regardless of other features. On the other hand, the features described in this specification may also be combined to provide various combinations as necessary.

The drawings and the related description are only intended to illustrate the idea of the invention. The invention may vary in its details within the scope of the claims.

The invention claimed is:

1. A mining vehicle having
   a carriage,
   driving equipment for moving the carriage,
   at least one mining work device, which mining work device is one of the following: rock drilling machine, bolting device, shotcrete apparatus, scaling device, injection device, blasthole charger, measuring device,
   an alternating current motor,
   a connection for supplying the mining vehicle from the electrical network of the mine,
   a DC intermediate circuit, to which electricity is supplied from the electrical network of the mine with a rectifier,
   an inverter for supplying the electrical energy of the DC intermediate circuit to the alternating current motor,
   an auxiliary energy source connected to the DC intermediate circuit, and
   a DC/DC converter between the auxiliary energy source and DC intermediate circuit configured to adapt the voltage level of the auxiliary energy source and configured to connect the auxiliary energy source to supply energy to the DC intermediate circuit, whereby auxiliary energy sources having different properties are connectable to the mining vehicle.

2. A mining vehicle as claimed in claim 1, wherein the mining vehicle has at least two DC/DC converters connected in parallel.

3. A mining vehicle as claimed in claim 1, wherein the mining vehicle has at least two auxiliary energy sources connected in parallel to the DC intermediate circuit.

4. A mining vehicle as claimed in claim 1, wherein the auxiliary energy source is connected to supply energy through the DC intermediate circuit to the alternating current motor of the mining vehicle when the energy requirement of the mining vehicle exceeds a certain limit while the mining vehicle simultaneously also receives energy from the electrical network of the mine.

5. A mining vehicle as claimed in claim 1, wherein the auxiliary energy source is a battery.

6. A mining vehicle as claimed in claim 1, wherein the rectifier of the mining vehicle is adapted to convert the supply voltage of at least two different-voltage electrical networks of the mine to be the same in the DC intermediate circuit.

7. A mining vehicle as claimed in claim 1, wherein the mining vehicle is a rock drilling rig.

8. A method for the energy supply of a mining vehicle with a carriage, drive equipment for moving the carriage, at least one mining work device, which mining work device is one of the following: rock drilling machine, bolting device, shotcrete apparatus, scaling device, injection device, blasthole charger, measuring device; and at least one alternating current motor that is supplied from the electrical network of the mine through a rectifier, DC intermediate circuit and inverter, wherein, by means of a DC/DC converter, the voltage level of an auxiliary energy source is adapted to the DC intermediate circuit and the auxiliary energy source is adapted to supply energy to the DC intermediate circuit, whereby auxiliary energy sources of different properties are connectable to the mining vehicle.

9. A method as claimed in claim 8, comprising supplying energy to the mining vehicle simultaneously from the electrical network of the mine and from the auxiliary energy source when the energy requirement of the mining vehicle exceeds a certain limit.

10. A method as claimed in claim 8, comprising adapting the rectifier of the mining vehicle to convert the supply voltages of at least two different-voltage electrical networks of the mine to be the same in the DC intermediate circuit.

11. A mining vehicle with a carriage, drive equipment for moving the carriage, at least one mining work device, which the mining work device is one of the following: rock drilling machine, bolting device, shotcrete apparatus, scaling device, injection device, blasthole charger, measuring device; an alternating current motor, a connection for supplying the mining vehicle from the electrical network of the mine, a DC intermediate circuit, to which electricity is supplied from the electrical network of the mine with a rectifier, an inverter for supplying the electrical energy of a DC intermediate circuit to the alternating current motor and an auxiliary energy source connected to the DC intermediate circuit wherein the auxiliary energy source is connected to supply energy through the DC intermediate circuit to the alternating current motor of the mining vehicle when the energy requirement of the mining vehicle exceeds a certain limit while the mining vehicle simultaneously also receives energy from the electrical network of the mine.

* * * * *